(12) United States Patent
Tashiro et al.

(10) Patent No.: US 10,710,589 B2
(45) Date of Patent: Jul. 14, 2020

(54) VEHICLE CONTROL DEVICE

(71) Applicant: Hitachi Automotive Systems, Ltd., Hitachinaka-shi, Ibaraki (JP)

(72) Inventors: Naoyuki Tashiro, Tokyo (JP); Toshio Hori, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 110 days.

(21) Appl. No.: 15/758,629

(22) PCT Filed: Aug. 5, 2016

(86) PCT No.: PCT/JP2016/073028
§ 371 (c)(1),
(2) Date: Mar. 8, 2018

(87) PCT Pub. No.: WO2017/056723
PCT Pub. Date: Apr. 6, 2017

(65) Prior Publication Data
US 2018/0304892 A1 Oct. 25, 2018

(30) Foreign Application Priority Data

Sep. 29, 2015 (JP) ................. 2015-190610

(51) Int. Cl.
*B60W 30/182* (2020.01)
*B60W 10/02* (2006.01)
(Continued)

(52) U.S. Cl.
CPC .......... *B60W 30/182* (2013.01); *B60W 10/02* (2013.01); *B60W 10/06* (2013.01);
(Continued)

(58) Field of Classification Search
CPC .... B60W 30/182; B60W 10/02; B60W 10/06; B60W 10/18; B60W 10/184;
(Continued)

(56) References Cited

U.S. PATENT DOCUMENTS

2006/0287798 A1  12/2006  Inoue et al.
2008/0183371 A1*  7/2008  Wolfgang .............. B60W 10/02
                                                       701/103
(Continued)

FOREIGN PATENT DOCUMENTS

CN         104755341 A      7/2015
DE   10 2008 029 453 A1    12/2009
(Continued)

OTHER PUBLICATIONS

Supplementary European Search Report issued in corresponding European Patent Application No. 16850900 dated May 8, 2019.
(Continued)

*Primary Examiner* — Stacey A Fluhart
(74) *Attorney, Agent, or Firm* — Foley & Lardner LLP

(57) ABSTRACT

An object of the present invention is to reduce discomfort of a driver, by appropriately controlling a vehicle, when driving a vehicle capable of changing a plurality of different traveling states of a power transmission state and a traveling state of an engine during traveling.
The present invention is a vehicle control device for controlling a vehicle having a power transmission mechanism which controls a power transmission state between an engine and an axle, and braking means. The vehicle control device includes, as vehicle traveling states, a power transmission engine stop traveling state in which power is transmitted by the power transmission mechanism and fuel supply to the engine is stopped to cause the vehicle to travel, and a power shutoff brake traveling state in which power
(Continued)

from the power transmission mechanism is shut off, the fuel supply to the engine is stopped, the braking means is controlled so that the braking force is smaller than the power transmission engine stop traveling state, and the vehicle is caused to travel.

16 Claims, 15 Drawing Sheets

(51) Int. Cl.
| | |
|---|---|
| *B60W 10/06* | (2006.01) |
| *B62D 35/00* | (2006.01) |
| *B60W 10/10* | (2012.01) |
| *B60W 10/184* | (2012.01) |
| *B62D 37/02* | (2006.01) |
| *F16D 48/06* | (2006.01) |
| *B60W 50/10* | (2012.01) |
| *B60W 10/101* | (2012.01) |
| *B60W 10/11* | (2012.01) |
| *B60W 10/18* | (2012.01) |
| *B60W 30/18* | (2012.01) |

(52) U.S. Cl.
CPC .......... *B60W 10/10* (2013.01); *B60W 10/101* (2013.01); *B60W 10/11* (2013.01); *B60W 10/18* (2013.01); *B60W 10/184* (2013.01); *B60W 30/18072* (2013.01); *B60W 30/18136* (2013.01); *B60W 50/10* (2013.01); *B62D 35/007* (2013.01); *B62D 37/02* (2013.01); *F16D 48/06* (2013.01); *B60W 2030/1809* (2013.01); *B60W 2030/18081* (2013.01); *B60W 2520/10* (2013.01); *B60W 2540/10* (2013.01); *B60W 2540/12* (2013.01); *B60W 2554/80* (2020.02)

(58) Field of Classification Search
CPC ..... B60W 30/18072; B60W 30/18136; B60W 2030/18081; B60W 2030/1809
See application file for complete search history.

(56) References Cited

U.S. PATENT DOCUMENTS

| | | | |
|---|---|---|---|
| 2011/0165992 A1* | 7/2011 | Ueno | B60K 6/365 |
| | | | 477/9 |
| 2013/0138312 A1 | 5/2013 | Breu et al. | |
| 2015/0046050 A1* | 2/2015 | Christen | B60W 10/02 |
| | | | 701/67 |
| 2015/0191172 A1* | 7/2015 | Kim | B60W 10/02 |
| | | | 477/94 |
| 2015/0274168 A1 | 10/2015 | Kuroki et al. | |
| 2015/0353091 A1* | 12/2015 | Kato | B60W 50/082 |
| | | | 477/174 |

FOREIGN PATENT DOCUMENTS

| | | |
|---|---|---|
| DE | 10 2011 102 332 B3 | 10/2012 |
| DE | 10 2011 050 739 A1 | 12/2012 |
| GB | 2 519 161 A | 4/2015 |
| JP | 2006-348840 A | 12/2006 |
| JP | 2009-051407 A | 3/2009 |
| JP | 2012-047148 A | 3/2012 |
| JP | 2012-097843 A | 5/2012 |
| JP | 2014-083999 A | 5/2014 |
| WO | WO-2014/064524 A1 | 5/2014 |

OTHER PUBLICATIONS

International Search Report with English translation and Written Opinion issued in corresponding application No. PCT/JP2016/073028 dated Nov. 22, 2016.
Office Action issued in corresponding Chinese Patent Application No. 201680054876.1 dated Dec. 18, 2019.

* cited by examiner (a)

(b)

(c)

(a)

(b)

(a)

(b)

(c)

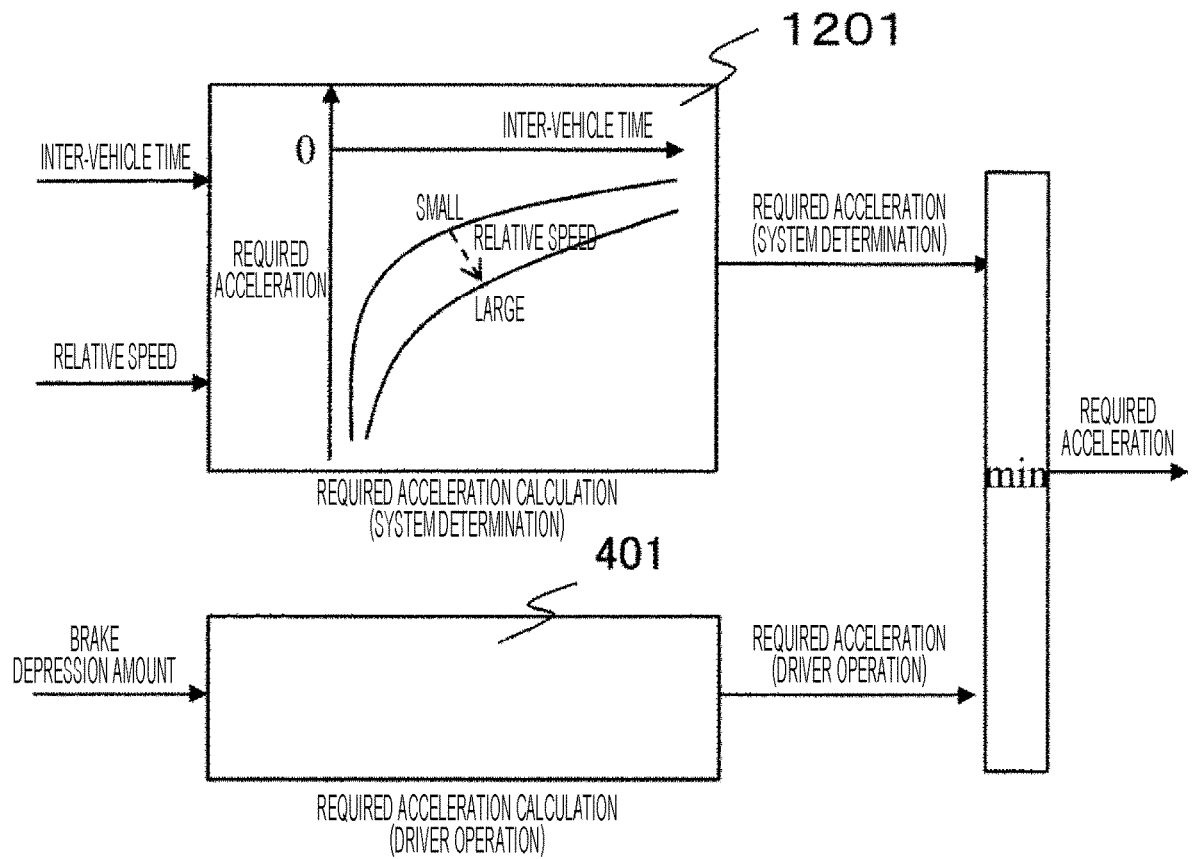

VEHICLE CONTROL DEVICE

TECHNICAL FIELD

The present invention relates to a vehicle control device.

BACKGROUND ART

There is PTL 1 as a background art of this technical field. The publication of PTL 1 discloses a vehicle control device in which a lower limit vehicle speed and an upper limit vehicle speed are set, and when the vehicle speed becomes equal to or higher than the upper limit vehicle speed, an engine is stopped, a power transmission mechanism between the engine and the wheels is opened, the vehicle is driven by coasting, and when the vehicle speed is equal to or lower than the lower limit vehicle speed, the engine is started, the power transmission mechanism is set in an engaged state to perform acceleration. Further, PTL 1 discloses a vehicle control device which determines whether or not it is necessary to stop the vehicle by detecting a signal or the like, and when it is determined to be necessary to stop the vehicle, the engine is continuously stopped up to a vehicle stop position to decelerate the vehicle by coasting.

Here, when the power transmission mechanism is set in an engaged state, the fuel supply to the engine is stopped and the vehicle is driven (engine brake), the deceleration of the engine brake becomes an addition of engine loss (mechanical loss, intake loss, etc.) to the traveling resistance. On the other hand, when the vehicle is caused to travel in a state in which the engine is stopped and the power transmission mechanism is disengaged (sailing stop), since the deceleration of the sailing stop is only the traveling resistance, the deceleration of the sailing stop becomes smaller than the deceleration of the engine brake.

Therefore, PTL 1 discloses a vehicle control device in which, when it is determined that there is a need to stop the vehicle and the distance up to the stop is equal to or larger than a predetermined value, the sailing stop is executed, and when the distance up to the stop becomes less than the predetermined value, by decelerating the vehicle with engine brake or brake, it is possible to lengthen the engine stop time to improve fuel economy.

CITATION LIST

Patent Literature

PTL 1: Japanese Patent Application Laid-Open No. 2012-47148

SUMMARY OF INVENTION

Technical Problem

In PTL 1, when it is determined to be necessary to stop the vehicle, the sailing stop and the engine brake are switched. However, there is a difference between the deceleration at the time of sailing stop traveling and the deceleration at the time of engine brake traveling. When it is necessary to slow moderate deceleration (such as when traveling to follow the preceding vehicle, etc.) by merely switching to either one, operability deteriorates. A specific explanation thereof is illustrated in FIG. 1.

In FIG. 1, a horizontal axis represents deceleration time, a vertical axis represents energy loss, and each point represents required deceleration with respect to a representative deceleration pattern. The required deceleration is small at the time of the deceleration pattern of the lower right of the graph, and the required deceleration is large at the time of deceleration pattern of the upper left of the graph. Each line illustrates the degree of deceleration when traveling with the engine brake and when traveling with the sailing stop. In a region I, by shifting the transmission ratio to a low side in the engine brake state, or by applying the brake, a desired deceleration is obtained. On the other hand, in a region II, in the deceleration pattern in which the deceleration is larger than the sailing stop and smaller than the engine brake, there is no means to be adjusted at present, and a difference from the required deceleration occurs. In this case, there is a problem that the deceleration assumed by a driver depending on the situation deviates from the actual deceleration of the vehicle, which may cause the driver to feel discomfort.

An object of the present invention is to reduce discomfort of a driver by appropriately controlling a vehicle when driving a vehicle capable of changing a plurality of different traveling states of a power transmission state or traveling state of an engine during traveling.

Solution to Problem

The present invention is a vehicle control device for controlling a vehicle having a power transmission mechanism which controls a power transmission state between an engine and an axle, and braking means. The vehicle control device includes, as vehicle traveling states, a power transmission engine stop traveling state in which power is transmitted by the power transmission mechanism and fuel supply to the engine is stopped to cause the vehicle to travel, and a power shutoff brake traveling state in which power from the power transmission mechanism is shut off, the fuel supply to the engine is stopped, the braking means is controlled so that the braking force is smaller than the power transmission engine stop traveling state, and the vehicle is caused to travel.

Advantageous Effects of Invention

According to the invention, it is possible to reduce discomfort of a driver by appropriately controlling a vehicle when driving a vehicle capable of changing a plurality of different traveling states of a power transmission state or traveling state of an engine during traveling.

BRIEF DESCRIPTION OF DRAWINGS

FIG. 19 is a block diagram illustrating required deceleration calculation in the third embodiment.

FIG. 20 is a diagram illustrating the reaction intensity of the driver in the third embodiment.

DESCRIPTION OF EMBODIMENTS

Hereinafter, embodiments of the present invention will be described with reference to the drawings.

First Embodiment

Figure 1:
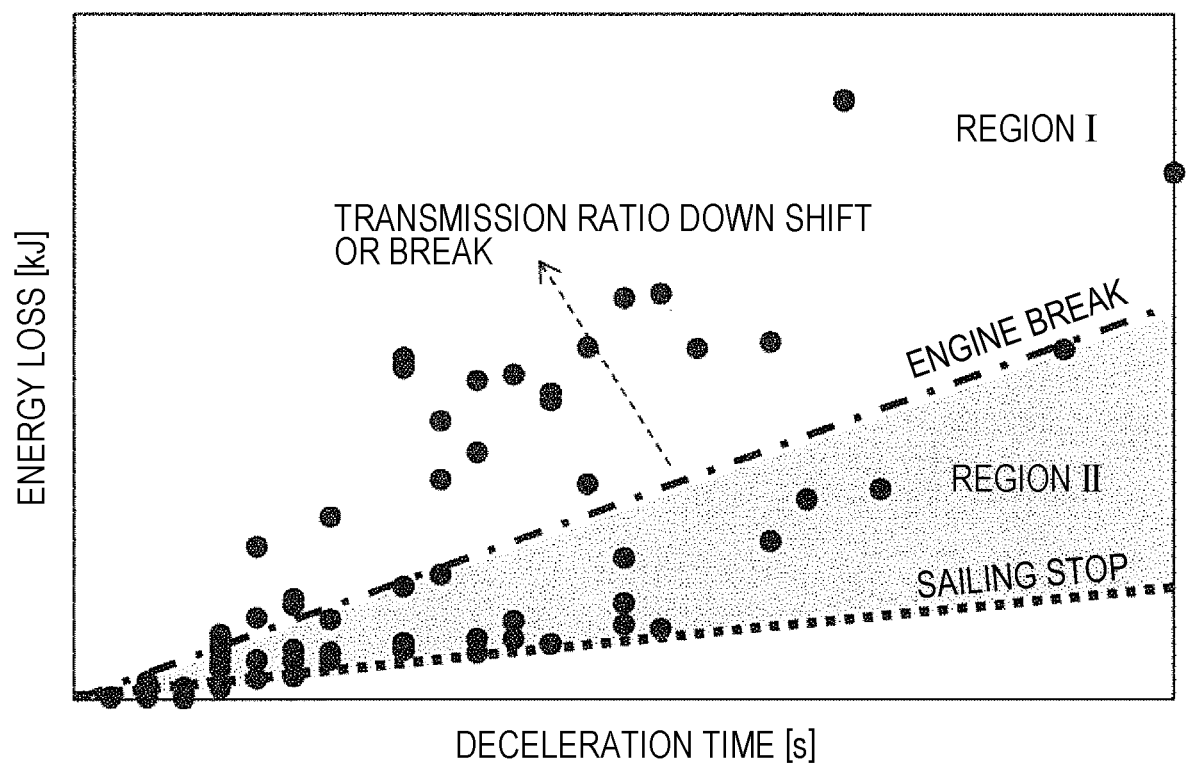
FIG. 1 is a diagram illustrating a relation between deceleration time and energy loss for traveling with engine brake and traveling at sailing stop.
Figure 2:
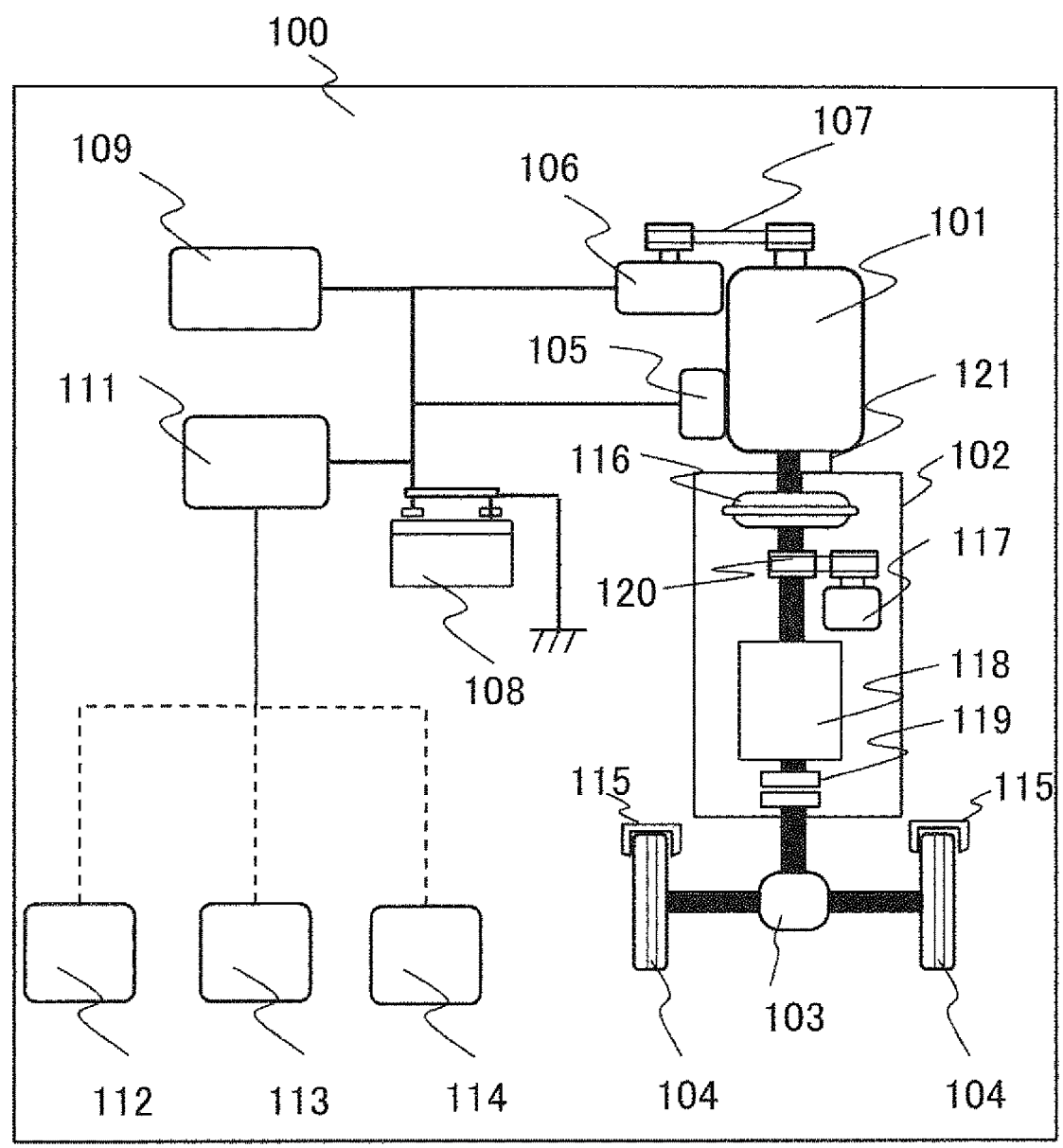
FIG. 2 is a diagram illustrating a configuration of a vehicle provided with a vehicle control device according to a first embodiment.

FIG. 2 is a diagram illustrating a configuration of a vehicle provided with a vehicle control device in this embodiment. As illustrated in FIG. 2, an engine 101 is mounted on the vehicle 100. The driving force generated by the engine 101 is transmitted to wheels 104 connected via a differential mechanism 103 through a power transmission mechanism 102, thereby causing the vehicle 100 to travel. Further, in order to decelerate the vehicle 100, wheels 104 are provided with a brake mechanism 115. The braking force is changed by a pressing amount of a brake pad in the brake mechanism 115, and the speed of the vehicle 100 is adjusted.

The power transmission mechanism 102 includes a torque converter 116, an oil pump 117, a transmission mechanism 118, and a clutch mechanism 119 capable of transmitting and cutting off the power from the engine 101 to the wheels 104. Further, the oil pump 117 is driven via an oil pump driving chain 120.

Here, the transmission mechanism 118 is not limited to a stepped transmission, but may be a continuously variable transmission in which a belt or a chain and a pulley are combined with each other. The clutch mechanism 119 may be provided between the oil pump driving chain 120 and the transmission mechanism 118, without being limited to being disposed between the transmission mechanism 118 and the differential mechanism 103.

A starter motor 105 is assembled to the engine 101 as a startup device. The starter motor 105 is driven by supplying the electric power from a battery 108, and the engine 101 also rotates in conjunction with the rotation of the starter motor 105. Here, a motor having functions of a starter motor and a generator may be used as the engine startup device, without being limited to the starter motor 105. Means 121 for detecting the rotation speed of the engine is attached to the engine 101. The engine is started by driving the starter motor 105 to start the fuel supply and perform ignition when the engine rotation speed reaches a predetermined value or higher.

A generator 106 is connected to the engine 101 via a drive belt 107. The generator 106 can generate electric power by being rotated in accordance with the rotation of the crankshaft. The generator 106 has a mechanism for varying the generated voltage by controlling the field current and can stop the power generation output.

The electric power generated by the generator 106 is supplied to the battery 108 and the in-vehicle electric component 109. The in-vehicle electric component 109 also includes an actuator for operating the engine 101, for example, a fuel supply device, an ignition device, and a controller 111 for controlling them, and is configured to include a lighting device such as a headlight, a brake lamp, and a direction indicator, and an air conditioner such as a blower fan and a heater.

Information detected by accelerator pedal depression amount detecting means 112 for detecting a depression amount of an accelerator pedal, brake pedal depression amount detecting means 113 for detecting a depression amount of brake pedal, and a vehicle speed detecting means 114 for detecting the speed of the vehicle is input to the controller 111.

The brake mechanism 115 may be provided with a mechanism for controlling the braking force by changing a pressing amount of the brake pad in accordance with the brake pedal depression amount of the driver, and an electric actuator mechanism capable of changing the pressing amount by a command value from the controller 111.

Further, the vehicle control device according to the present embodiment has, as vehicle traveling states, a power transmission engine stop traveling state (specifically, a second traveling state to be described later), a power shutoff brake traveling state (specifically, a third traveling state to be described later), and a coasting travel state (specifically, a first traveling state to be described later). The power transmission engine stop traveling state is a mode in which the power is transmitted by the power transmission mechanism, and the fuel supply to the engine is stopped to allow the vehicle to travel. The power shutoff brake traveling state is a mode in which the power from the power transmission mechanism is shut off, the fuel supply to the engine is stopped, and the braking means is controlled so that the braking force becomes smaller than the power transmission engine stop traveling state to allow the vehicle to travel. The coasting travel state is a mode in which power from the power transmission mechanism is shut off, fuel supply to the engine is stopped, and the vehicle is allowed to travel by inertia without performing braking using the braking means.

Figure 3:
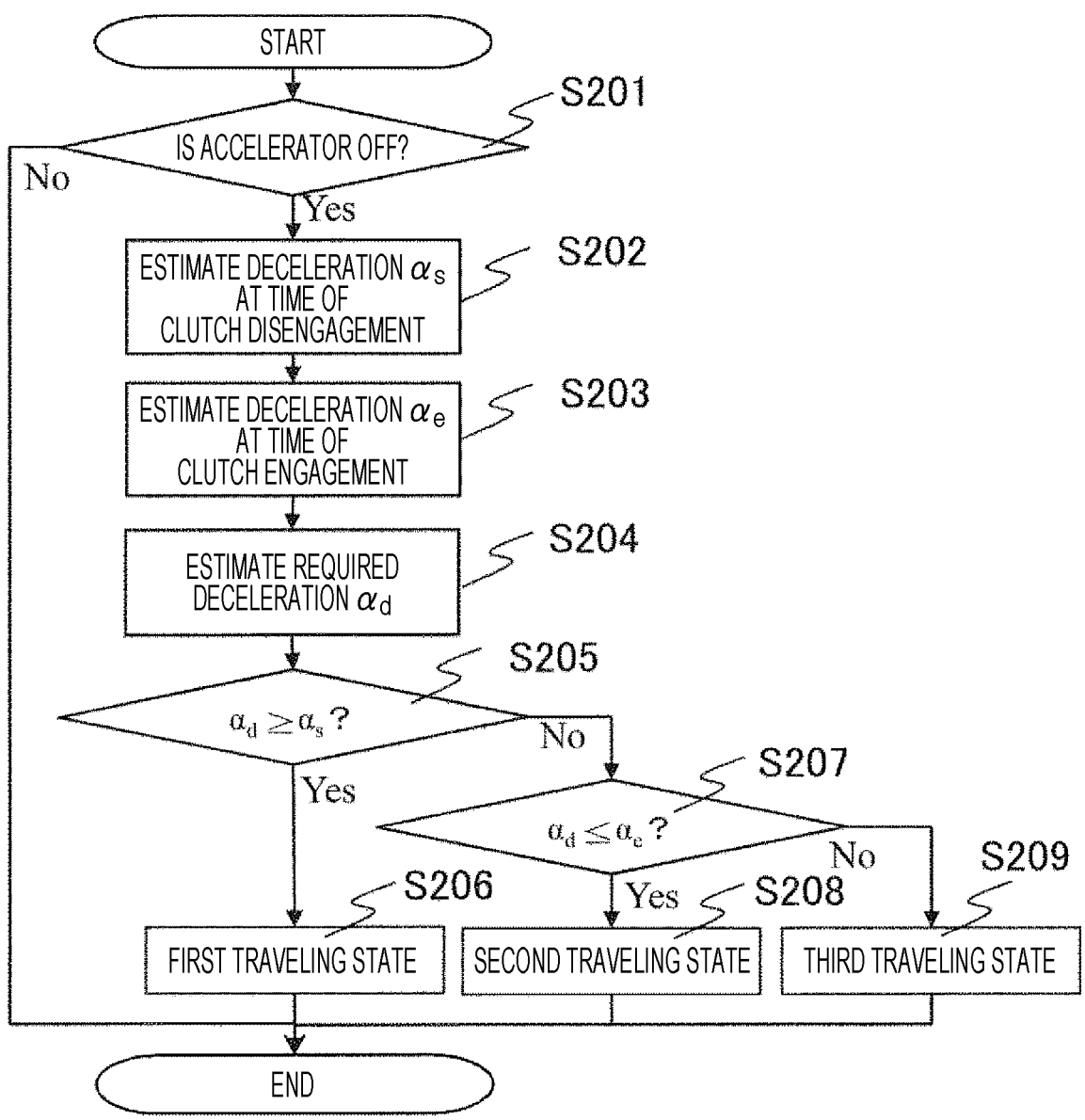
FIG. 3 is a flow chart of control in the first embodiment.

The control method in the first embodiment will be described in detail with reference to FIGS. 3 through 7. First, FIG. 3 illustrates a flowchart of control in the embodiment.

In an accelerator off determination S201, when an accelerator pedal depression amount is detected to be zero by the accelerator depression amount detecting means 113, an accelerator off is determined, and the progress proceeds to S202. When the accelerator pedal depression amount is not zero, the process of the control is terminated.

In a deceleration estimation at the time of clutch disengagement S202, the vehicle deceleration $\alpha_s$ at the time of disengaging of the clutch is estimated by the formula (1).

[Formula 1]

$$\alpha_s = -\frac{1}{M}C_d S V^2 - \mu g - g\sin\theta \quad (1)$$

Here, M is a vehicle weight, $C_d$ is an air resistance coefficient, S is a front projection area of the vehicle, V is a vehicle speed, $\mu$ is a rolling resistance coefficient, g is a gravitational acceleration, and $\theta$ is a road surface gradient.

In a deceleration estimation at the time of clutch engagement S203, the vehicle deceleration $\alpha_e$ at the time of clutch engagement is estimated by the formula (2).

[Formula 2]

$$\alpha_e = -\frac{1}{M}C_d S V^2 - \mu g - g\sin\theta - \frac{F_e}{M} \quad (2)$$

Here, $F_e$ represents the engine loss torque in a state in which the torque converter 116 and the clutch mechanism 119 are engaged, with the fuel supply to the engine 101 stopped.

Figure 4:
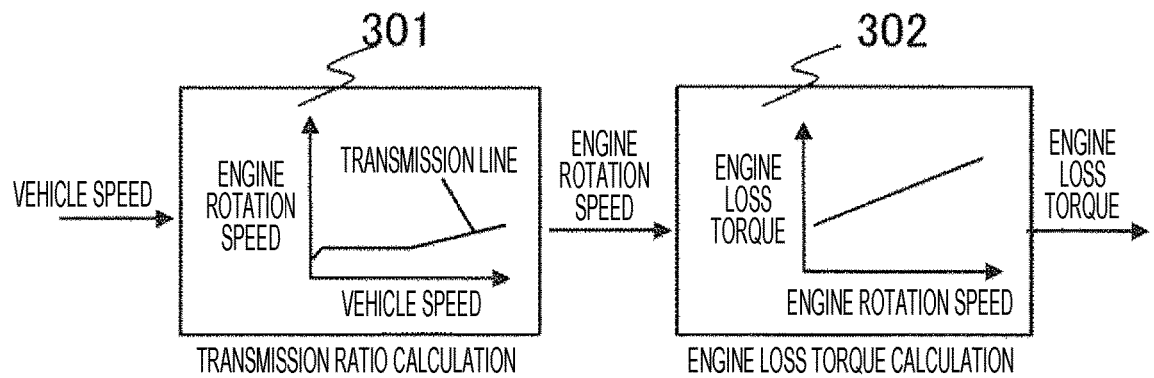
FIG. 4 is a block diagram illustrating calculation of engine loss torque in the first embodiment.

The engine loss torque $F_e$ changes by the engine speed. Also, since the gear ratio of the transmission mechanism 118 varies by the vehicle speed, the engine rotation speed also changes. Therefore, as illustrated in FIG. 4, in the transmission ratio calculation 301, first, the transmission ratio is calculated on the basis of the transmission line when the accelerator depression amount is zero, and the engine rotation speed is output on the basis of the vehicle speed and the transmission ratio. Next, in the engine loss torque calculation 302, the engine loss torque $F_e$ is calculated on the basis of the engine rotation speed. Here, by using the transmission line when the accelerator depression amount is zero, it is possible to minimize the engine rotation speed, and as a result, it is possible to minimize the engine loss torque.

In a required deceleration estimation S204, the deceleration required by the driver is estimated. Specifically, as illustrated in the required deceleration calculation (driver operation) 401 of FIG. 5, when the brake pedal depression amount is equal to or larger than zero and equal to or less than a predetermined value $b_{on}$ by the brake pedal depression amount detecting means 113 (region I), it is determined that there is a driving intention due to inertia, and the required deceleration $\alpha_d$, which is the deceleration required from the driver by the driver operation, is set as the vehicle deceleration $\alpha_s$ at the time of clutch disengagement. Here, $b_{on}$ is a region (brake play) in which no brake braking force is generated.

When the depression amount is larger than the predetermined value $b_{on}$ (Region II), the setting is made so that a larger braking force is generated as the depression amount of the brake is larger.

Figure 5:
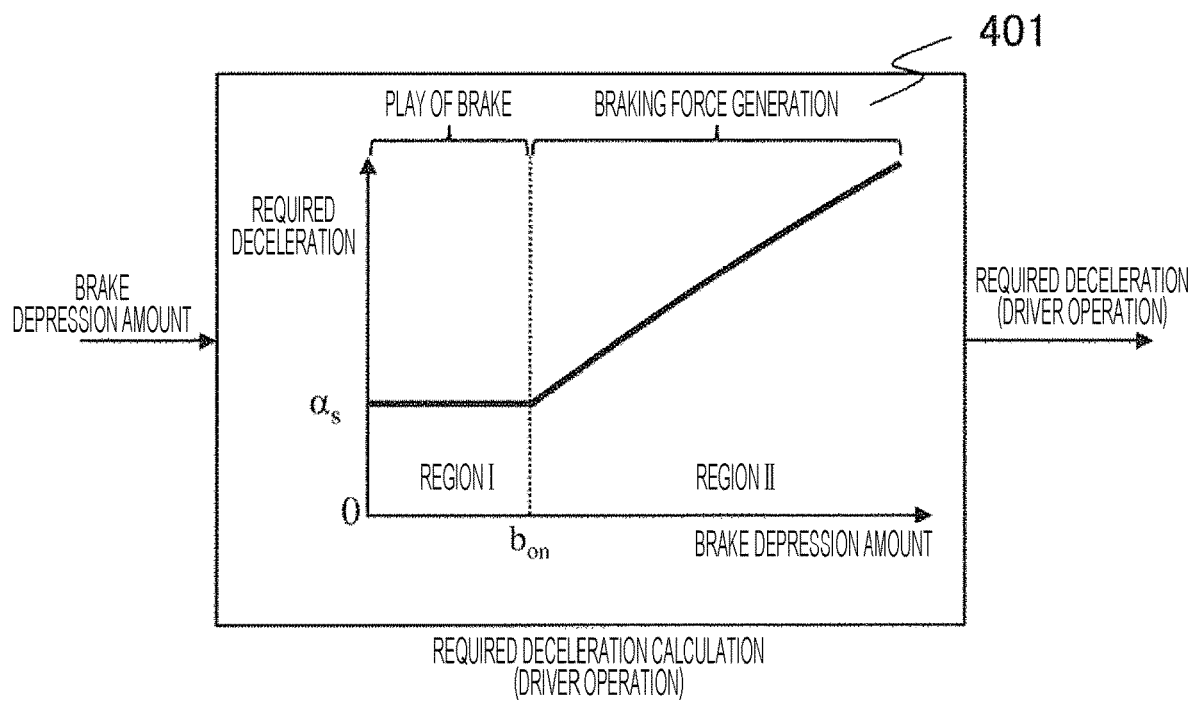
FIG. 5 is a block diagram illustrating required deceleration calculation in the first embodiment.
Figure 6:
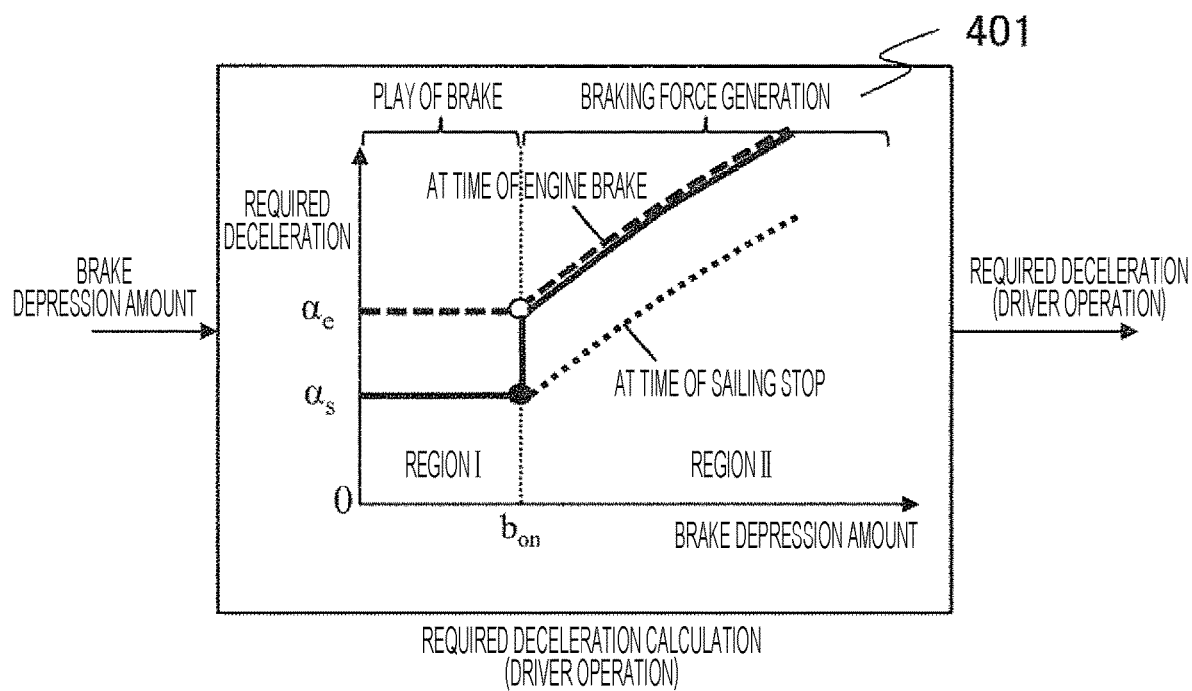
FIG. 6 is a diagram illustrating a correction method of the required deceleration calculation in the first embodiment.

Here, the required deceleration estimation S204 is not limited to FIG. 5 and may be set as illustrated in FIG. 6. The dotted line of FIG. 6 is the deceleration that occurs at the time of engine brake and at the time of sailing stop. In a case where the brake depression amount is larger than the predetermined value $b_{on}$ (region II), since torque of the engine loss is transmitted to the wheels at the time of engine brake, deceleration greater at the time of engine brake than at the time of sailing stop is required for the same brake pedal depression amount, and discomfort arises in the brake feeling. Therefore, as illustrated in FIG. 6, when the brake depression amount is smaller than the predetermined value $b_{on}$ at the time of sailing stop (region I), the required deceleration $\alpha_d$, which is the deceleration required from the driver by the driver operation, is set as a vehicle deceleration $\alpha_s$ at the time of clutch disengagement, and when the brake pedal depression amount is larger than the predetermined value $b_{on}$ (region II), the required deceleration $\alpha_d$, which is the deceleration required from the driver by the driver operation, is set as the deceleration at the time of engine brake. Thus, the same braking force can be generated for the same brake depression amount, and it is possible to expect to suppress degradation of operability.

In S205, the required deceleration $\alpha_d$ is compared with the vehicle deceleration $\alpha_s$ at the time of clutch disengagement. When the required deceleration $\alpha_d$ is equal to or greater than $\alpha_s$, the process proceeds to S206, and when $\alpha_d$ is smaller than $\alpha_s$, the process proceeds to S207.

In a first traveling state of S206, as illustrated in FIG. 7(a), the clutch mechanism 119 is set in a disengaged state and traveling is performed in a state in which fuel supply to the engine 101 is stopped. Here, if the clutch mechanism 119 is disengaged, the torque converter 116 may be kept in the engaged state.

In S207, the required deceleration $\alpha_d$ is compared with the vehicle deceleration $\alpha_e$ at the time of clutch engagement. When the required deceleration $\alpha_d$ is equal to or less than $\alpha_e$, the process proceeds to S208, and when the required deceleration $\alpha_d$ is larger than $\alpha_e$, the process proceeds to S209.

In a second traveling state of S208, as illustrated in FIG. 7(b), the torque converter 116 and the clutch mechanism 119 are set in the engaged state together, and traveling is performed in the state in which fuel supply to the engine 101 is stopped (so-called engine brake state).

In a third traveling state of S209, as illustrated in FIG. 7(c), the clutch mechanism 119 is set in the engaged state and the torque converter 116 is set in the disengaged state to perform deceleration by transmission loss. In this case, the fuel supply to the engine 101 may be stopped.

Further, when as illustrated in FIG. 7(a), a state in which both the torque converter 116 and the clutch mechanism 119 constituting the power transmission mechanism are engaged is set as a "transmission" state, as illustrated in FIG. 7(b), a state in which both of them is released is set as a "shutoff", and as illustrated in FIG. 7(c), a state in which the torque converter 116 is released but the clutch mechanism 119 is engaged is set as a so-called "semi-transmission" state, the vehicle control device can also be expressed as follows. That is, the vehicle control device controls a vehicle which has a power transmission mechanism for controlling the power transmission state between the engine and the axle to one of transmission, half-transmission, and shutoff, and braking means for obtaining deceleration. The vehicle control device attains a fuel stop traveling state in which fuel supply to the engine is stopped, attains the fuel stop traveling state, controls the power transmission mechanism to the shutoff state, and controls the braking means to obtain a deceleration smaller than the deceleration of the vehicle in a traveling state in which the transmission mechanism is controlled to the transmission.

Figure 8:
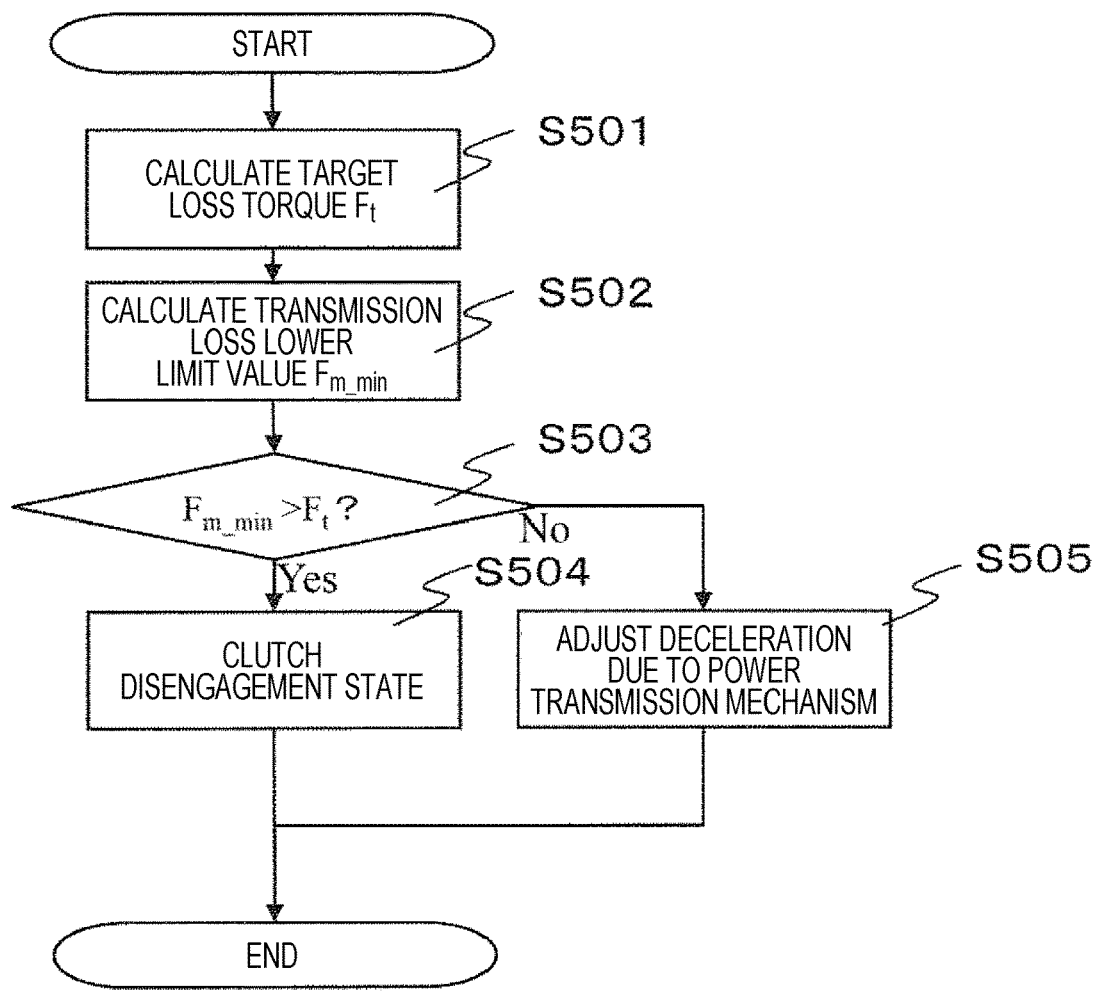
FIG. 8 is a flowchart of a third traveling state in the first embodiment.

A specific process of S209 will be described with reference to FIG. 8. First, in S501, a target loss torque $F_t$ is calculated by the formula (3) on the basis of the required deceleration $\alpha_d$ and the vehicle deceleration $\alpha_s$ at the time of clutch disengagement.

[Formula 3]

$$F_t = M(\alpha_d - \alpha_s) \quad (3)$$

Figure 9:
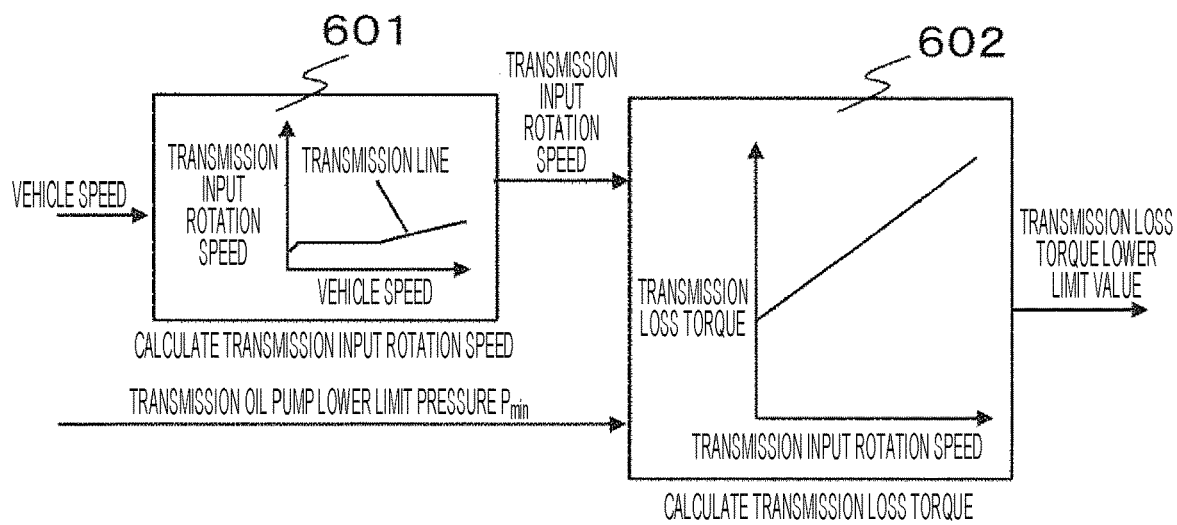
FIG. 9 is a block diagram illustrating the calculation of a transmission loss torque lower limit value in the first embodiment.

Next, in S502, a transmission loss lower limit value $F_{m\_min}$ is calculated on the basis of the vehicle speed and the transmission ratio. A specific process is illustrated in FIG. 9. First, the vehicle speed is input to a transmission input rotation speed calculation 601, and the transmission input rotation speed is calculated on the basis of the transmission line when the accelerator depression amount is zero. Here, by using the transmission line when the accelerator depression amount is zero, the torque transmitted to the wheels 104 when switching from the second traveling state to the first traveling state decreases, and the shock at the time of switching is reduced.

Next, a lower limit pressure $P_{min}$ of the transmission oil pump and the transmission input rotation speed are input to the transmission torque loss 602, and the transmission torque loss lower limit value $F_{m\_min}$ is calculated. Here, the lower limit pressure $P_{min}$ of the transmission oil pump is calculated on the basis of the minimum pressure required to set the clutch mechanism 119 or the like in an engaged state.

In step S503, the transmission loss lower limit value $F_{m\_min}$ is compared with the target loss torque $F_t$. When the target loss torque $F_t$ is smaller than the transmission loss lower limit value $F_{m\_min}$, the process proceeds to step S504, the clutch mechanism 119 is set in the disengaged state, and the process is terminated. When the target loss torque $F_t$ is larger than the transmission loss lower limit value $F_{m\_min}$, the process proceeds to S505, the clutch mechanism 119 is set in the engaged state, and the transmission loss is adjusted by controlling the transmission ratio.

Figure 10:
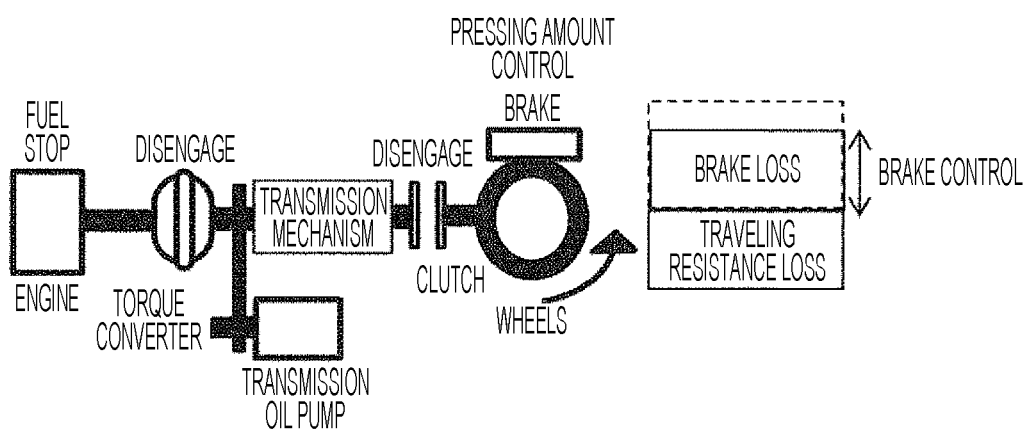
FIG. 10 is a diagram illustrating a control mode of the third traveling state in the first embodiment.
Figure 10:
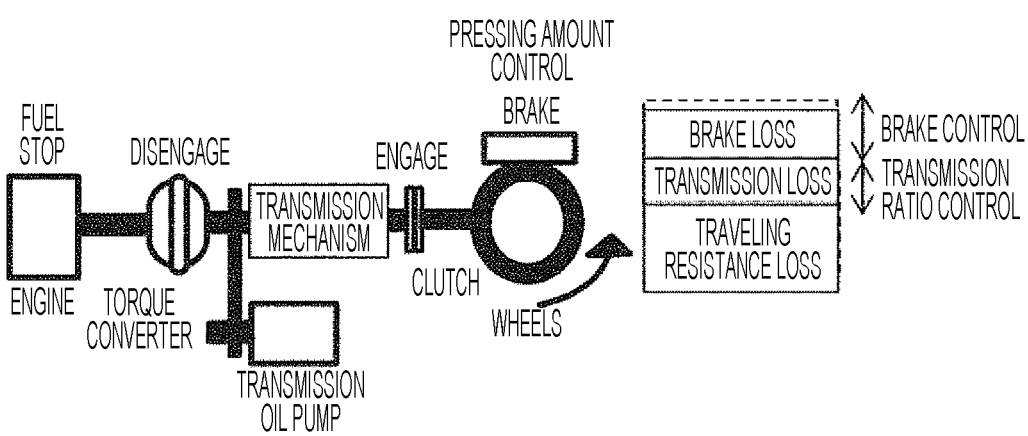

The control mode in the third traveling state according to the present embodiment is not limited to FIG. 7(c), and as illustrated in FIG. 10(a), deceleration may be performed only by the brake mechanism 115 after the clutch mechanism 119 is set in the disengaged state. Also, as illustrated in FIG. 10(b), the control mode may be a cooperative control of the brake mechanism 115 and the power transmission mechanism.

Figure 11:
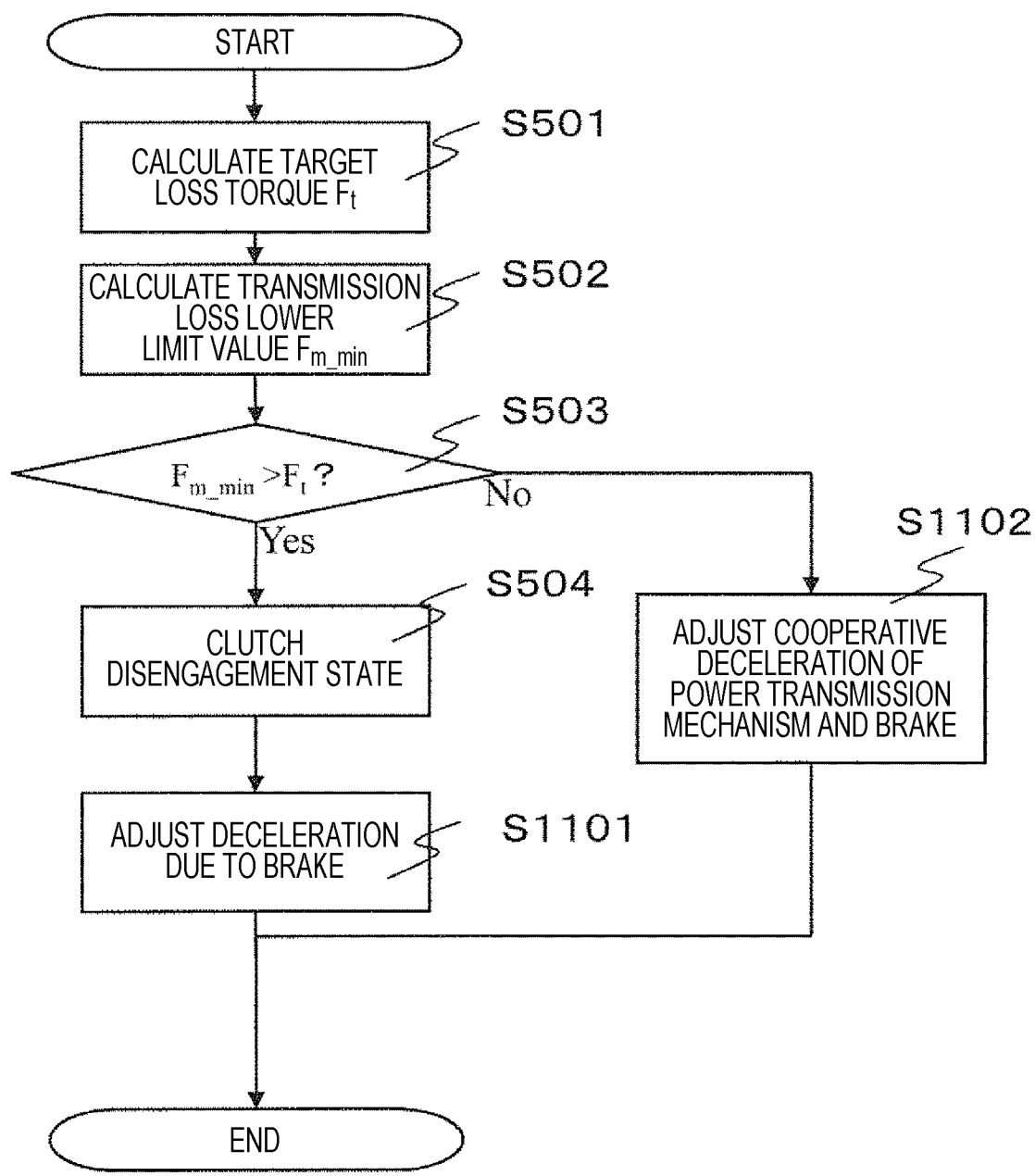
FIG. 11 is a flowchart at the time of cooperation with the brake of the third traveling state in the first embodiment.

A specific process of S209 using the brake mechanism and the power transmission mechanism will be described with reference to FIG. 11. When the target loss torque $F_t$ is smaller than the transmission loss lower limit value $F_{m\_min}$ in S503, the clutch is set in the disengaged state, and the process proceeds to the deceleration adjustment process using the brake of S1101. This makes it possible to prevent a situation in which the transmission loss $F_{m\_min}$ becomes larger than the target loss torque $F_t$ due to the engagement of the clutch mechanism 119, and the deceleration becomes smaller than the required deceleration.

On the other hand, when the target loss torque $F_t$ is larger than the transmission loss lower limit value $F_{m\_min}$, the process proceeds to the cooperative deceleration adjustment process of the power transmission mechanism and brake of S1102.

Figure 12:
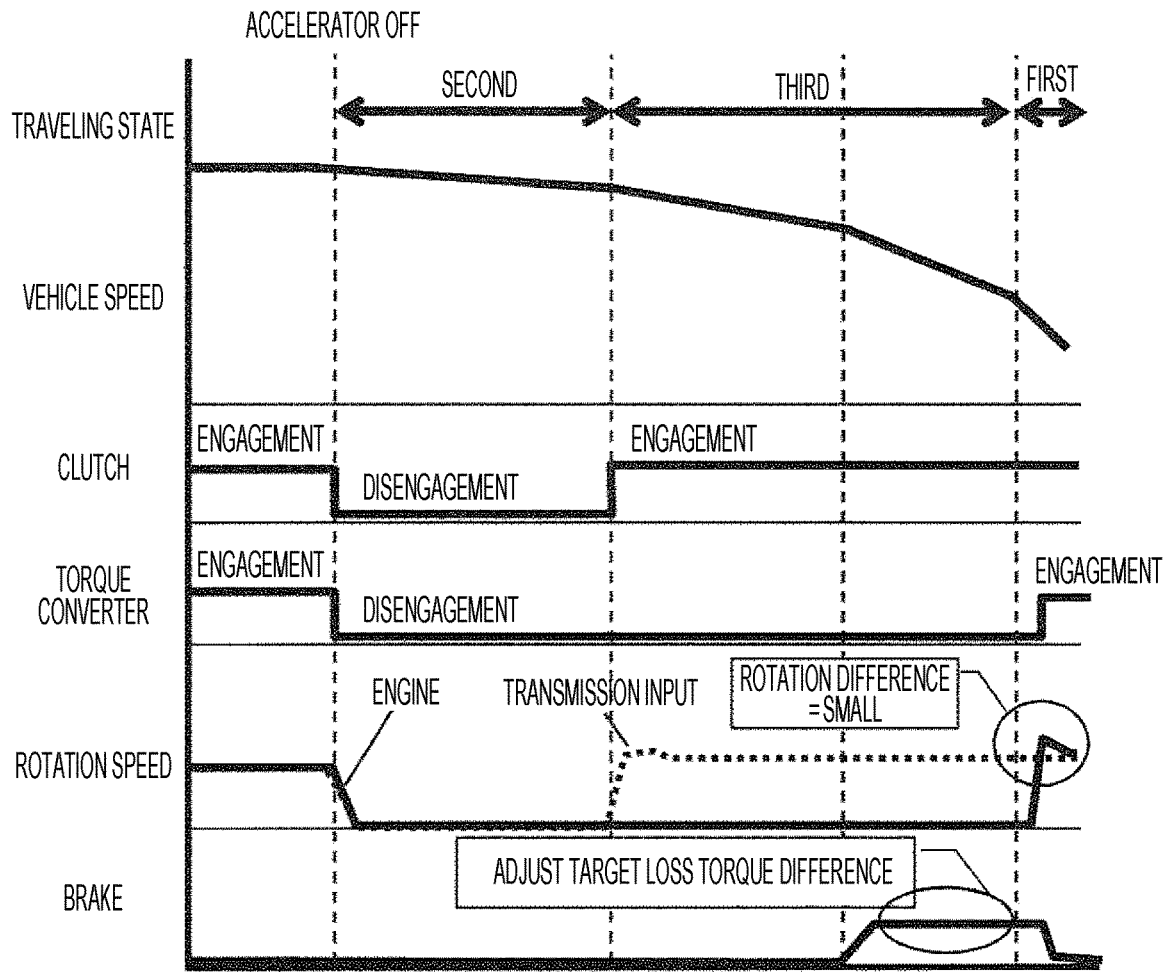
FIG. 12 is a time chart in the first embodiment.

In the cooperative deceleration adjustment process of the power transmission mechanism and brake S1102, loss of the power transmission mechanism is generated with priority. That is, as illustrated in FIG. 12, this means that the clutch mechanism 119 is engaged and the transmission input rotation speed is increased. Thus, when switching to the first traveling state, the torque converter can be quickly set in the engaged state. Further, in a case where the target loss torque difference cannot be covered by the transmission loss, it is possible to achieve the required deceleration by adjusting the brake loss amount, and the drivability is improved.

In the conventional vehicle control device, since an engine brake that performs braking by the engine loss has a relatively large braking force, braking is performed more than necessary, and in order to maintain or raise the speed, there was a case where the engine needs to be driven again.

In this regard, according to the vehicle control device of the present embodiment, when driving a vehicle capable of changing a plurality of different traveling states of a power transmission state or a traveling state of the engine during traveling, by appropriately controlling the vehicle, it is possible to reduce discomfort of the driver. That is, according to the vehicle control device of this embodiment, it is possible to generate a deceleration which is larger than the deceleration at the time of sailing stop traveling and smaller than the deceleration at the time of engine brake traveling. Therefore, it also leads to an improvement in operability of the driver when the driver performs a manual operation. Further, utilization of the power shutoff brake traveling state as described above by way of example of the vehicle control device is effective not only in a manual operation but also in an automatic operation in order to reduce the discomfort of the driver.

Second Embodiment

Figure 13:
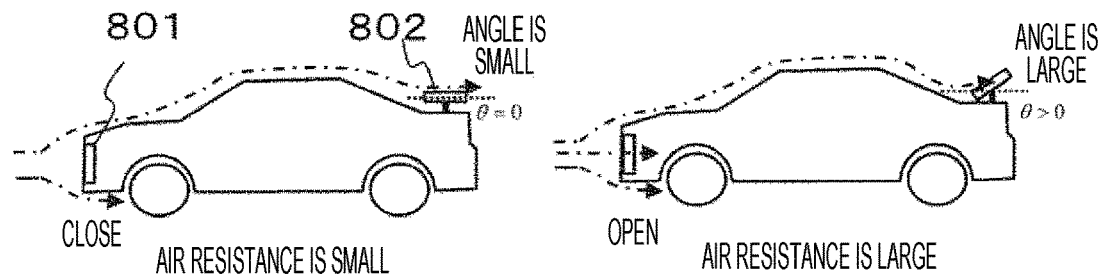
FIG. 13 is a diagram illustrating the configuration of a vehicle including the vehicle control device according to a second embodiment.

In the present embodiment, a vehicle having means capable of adjusting the air resistance in the traveling resistance of the vehicle will be described. Here, as means capable of adjusting the air resistance, as illustrated in FIG. 13, there are a front air resistance adjustment mechanism 801 attached to the front of the vehicle, a rear air resistance adjustment mechanism 802 attached to the rear of the vehicle, and the like. An example of the front air resistance adjustment mechanism 801 is to control the flow of air by opening and closing the shutter, and the air resistance becomes larger in the open state of the shutter than in the closed state of the shutter. An example of the rear air resistance adjustment mechanism 802 is to control the flow of air by switching between the stored state and the non-stored state of the spoiler and by adjusting the angle of the spoiler in the non-stored state, and in a state in which the spoiler appears and as the angle is larger, the air resistance is larger.

Figure 14:
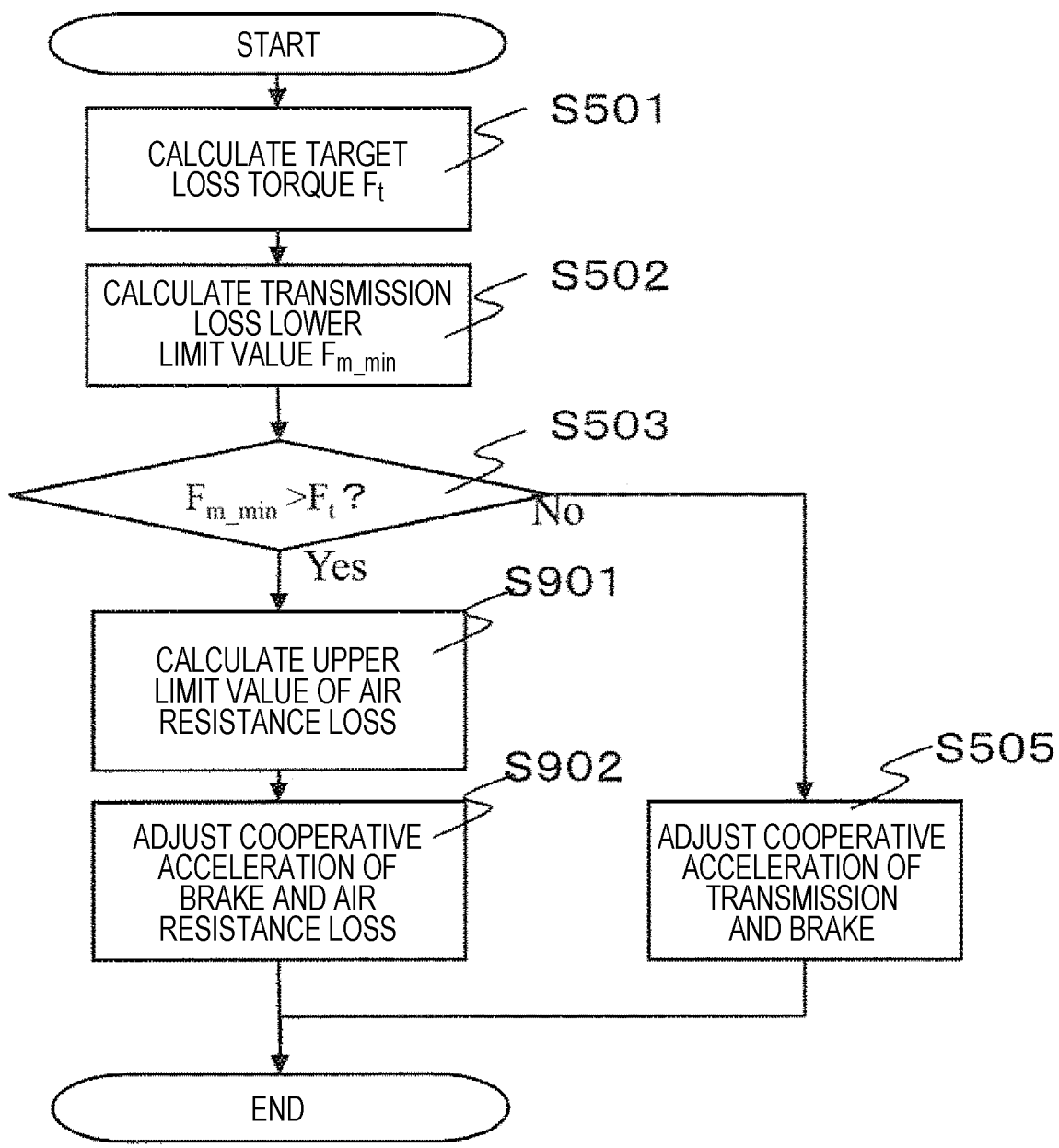
FIG. 14 is a flowchart of the third traveling state in the second embodiment.
Figure 15:
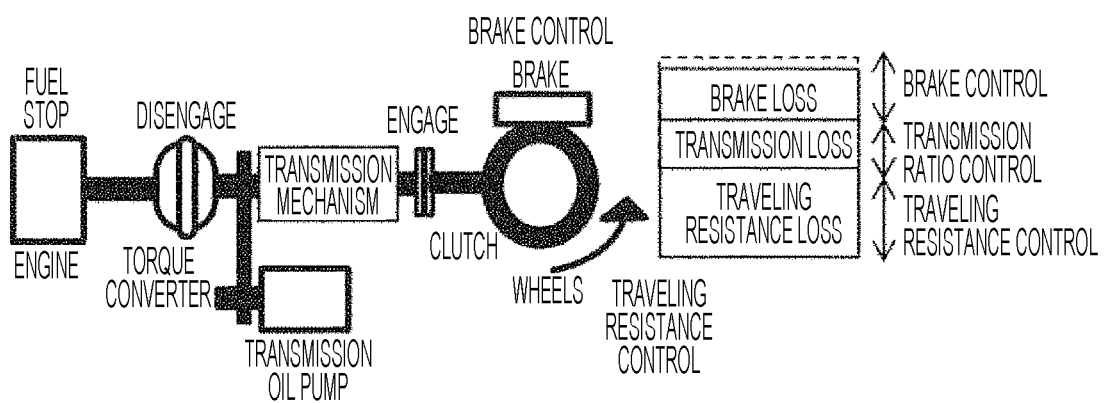
FIG. 15 is a diagram illustrating a control mode of a third traveling state in the second embodiment.

The control method of the present embodiment will be described with reference to FIG. 14. Specifically, as illustrated in FIG. 15, first, in S501, the target loss torque $F_t$ is calculated by the formula (3) on the basis of the required deceleration $\alpha_d$ and the vehicle deceleration $\alpha_s$ at the time of clutch disengagement.

Next, in S502, the transmission loss lower limit value $F_{m\_min}$ is calculated on the basis of the vehicle speed and the transmission ratio. Next, the lower limit pressure $P_{min}$ of the transmission oil pump and the transmission input rotation speed are input to the transmission torque loss 602, and the transmission torque loss lower limit value $F_{m\_min}$ is calculated. Here, the lower limit pressure $P_{min}$ of the transmission oil pump is calculated on the basis of the minimum pressure required to set the clutch mechanism 119 or the like in an engaged state.

In S503, the transmission loss lower limit value $F_{m\_min}$ is compared with the target loss torque $F_t$, and when the target loss torque $F_t$ is smaller than the transmission loss lower limit value $F_{m\_min}$, the process proceeds to S901, and when the target loss torque $F_t$ is larger than the transmission loss lower limit value $F_{m\_min}$, the process proceeds to the cooperative deceleration adjustment process of the power transmission mechanism and brake of S505.

Figure 7:
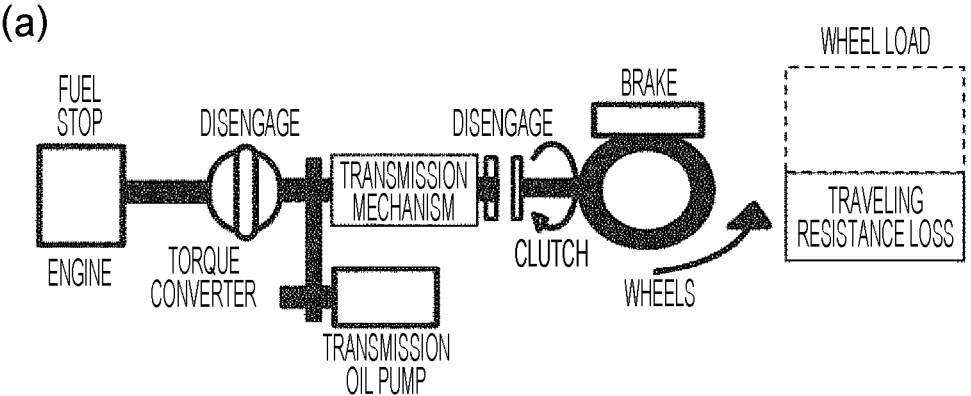
FIG. 7 is a diagram illustrating a traveling state in the first embodiment.
Figure 7:
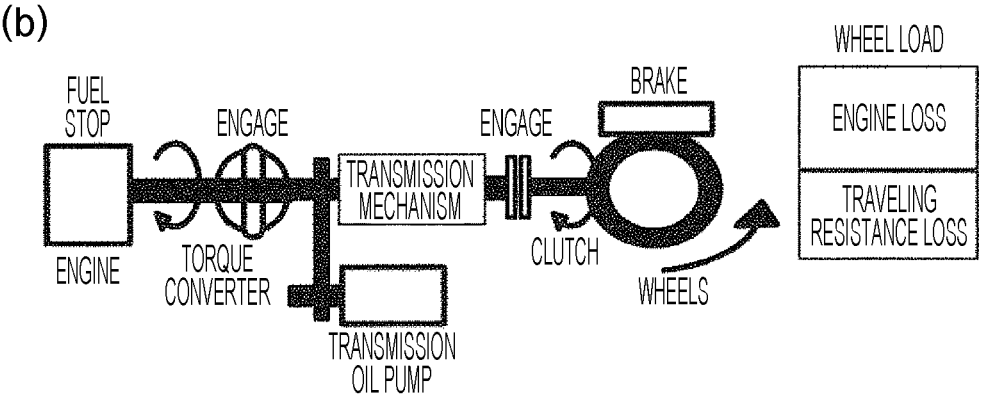
Figure 7:
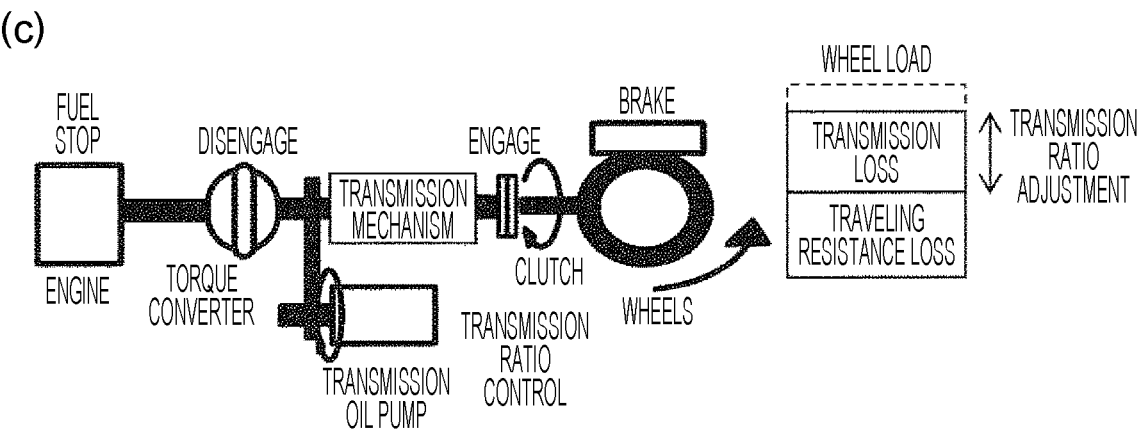

In the cooperative deceleration adjustment process of the power transmission mechanism and brake S505, the loss of the power transmission mechanism is generated with priority. That is, as illustrated in FIG. 7, this means that the clutch mechanism 119 is engaged and the transmission input rotation speed is increased.

In S901, the upper limit value $f_{a\_max}$ of the air resistance loss is calculated. Specifically, the air resistance loss $f_a$ is calculated by the formula (4), and the air resistance loss is adjusted by changing the $C_d$ value.

[Formula 4]

$$f_a = C_d S V^2 \quad (4)$$

Therefore, when the $C_d$ value in the second traveling state is set as $C_{d2}$, and when the target $C_d$ value in the third traveling state is set as $C_{dt}$, an air resistance loss increase $f_{a\_s}$ can be calculated by formula (5).

[Formula 5]

$$f_{a\_s} = -(C_{dt} - C_{d2}) S V^2 \quad (5)$$

Here, since $C_{dt}$ is limited by the control state of the means capable of adjusting the air resistance, as illustrated in the formula (6), the means capable of adjusting the air resistance outputs the result of selecting the smaller value between the maximum value $C_{d\_max}$ of the $C_d$ value which can change in that state and the target $C_d$ value $C_{dt}$, as the upper limit value $f_{a\_max}$ of the air resistance loss.

[Formula 6]

$$f_{a\_max} = -(\min(C_{dt}, C_{d\_max}) - C_{d2}) S V^2 \quad (6)$$

Figure 17:
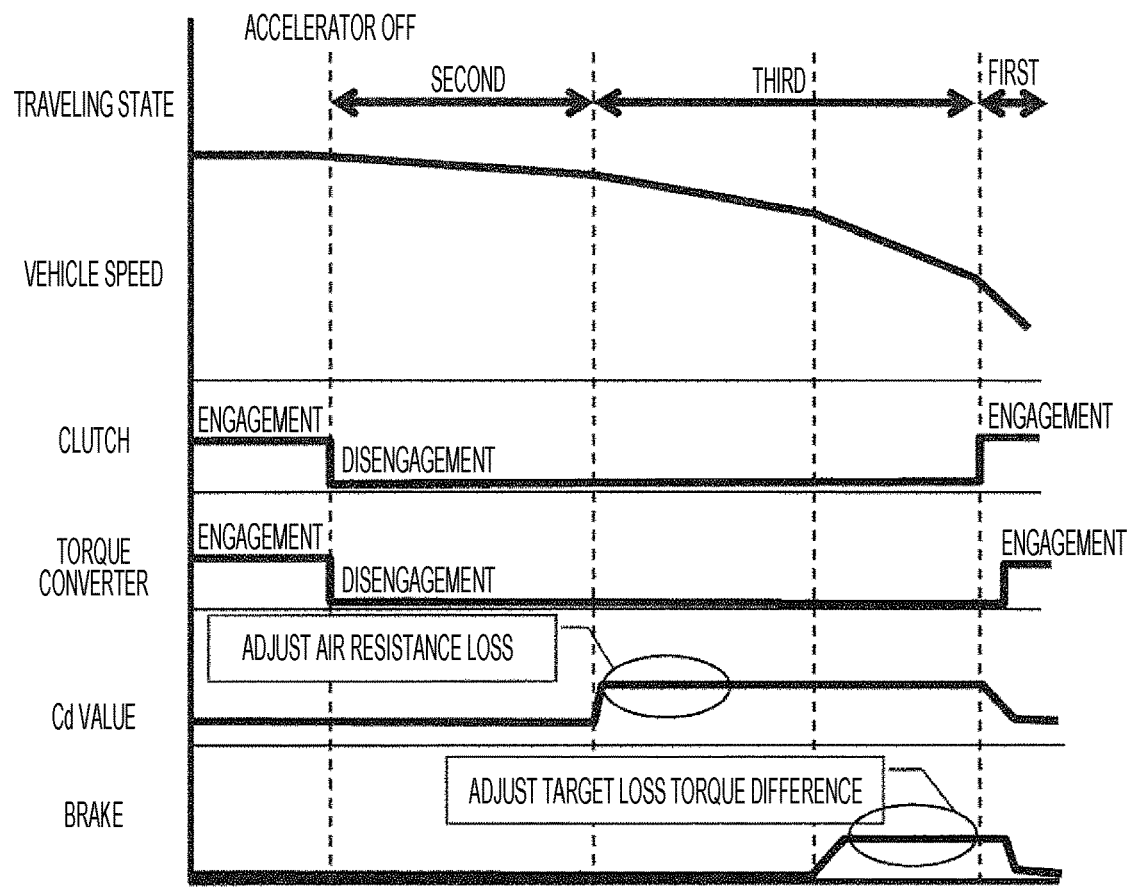
FIG. 17 is a time chart in the second embodiment.

In S902, as illustrated in FIG. 17, the target loss torque $F_t$ is achieved by compensating for the loss torque which cannot be achieved in the air resistance loss $f_{a\_max}$, by the brake loss amount. This makes it possible to reduce the burden of the brake loss amount, and it is possible to prevent overheating or wear of the brake pad.

Figure 16:
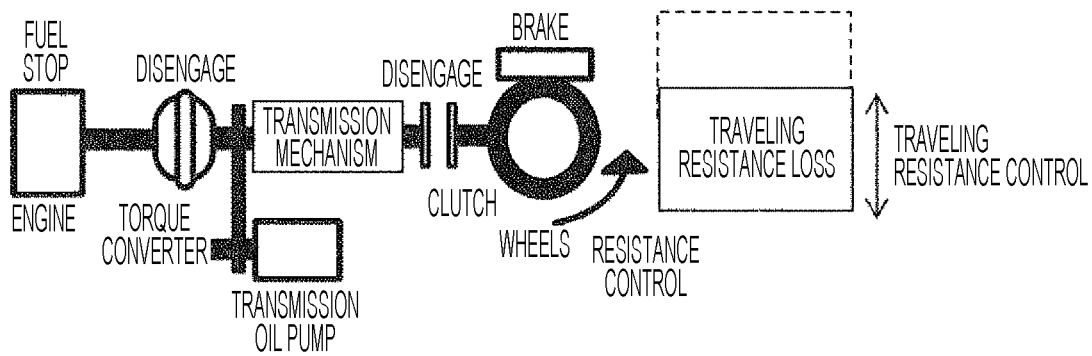
FIG. 16 is a diagram illustrating another control mode of the third traveling state in the second embodiment.
Figure 16:
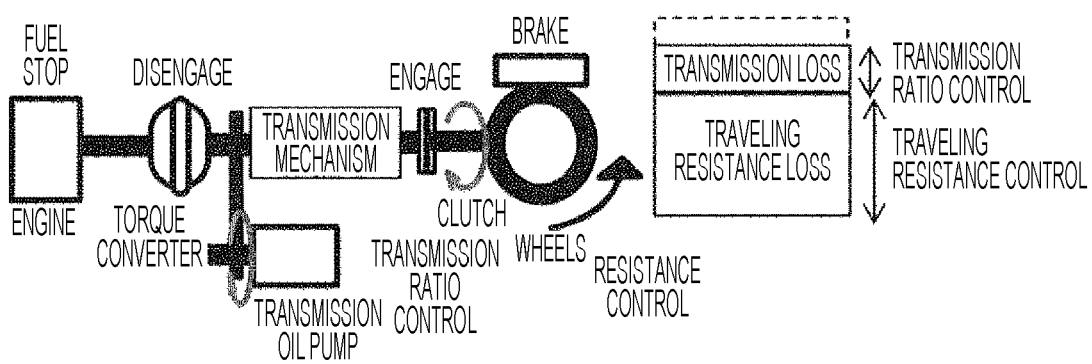
Figure 16:
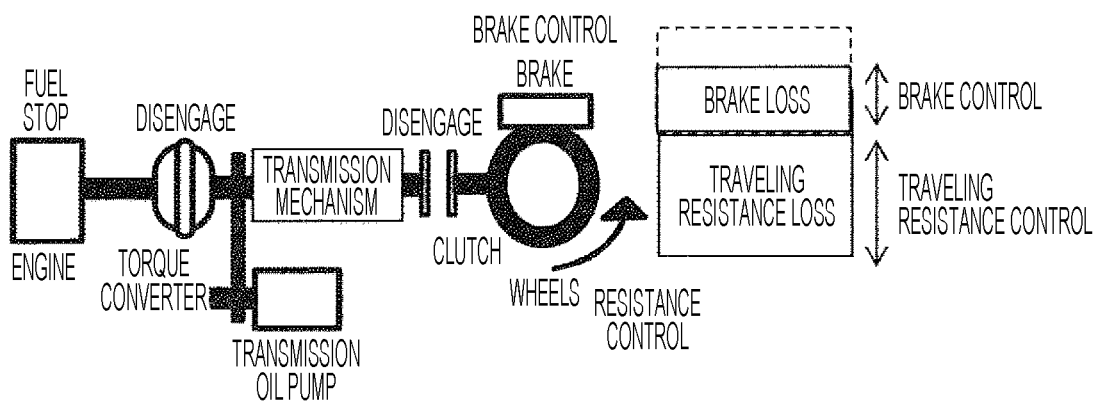

The control mode in the third traveling state according to the present embodiment is not limited to FIG. 15. As illustrated in FIG. 16(a), after the clutch mechanism 119 is set in the disengaged state, deceleration may be performed only by the means capable of adjusting the air resistance. Further, as illustrated in FIG. 16(b), it is also possible to perform deceleration by a cooperative control of means capable of adjusting air resistance and the power transmission mechanism. Further, as illustrated in FIG. 16(c), the deceleration may be performed by the cooperative control of the brake mechanism 115 and the means capable of adjusting the air resistance.

Third Embodiment

Figure 18:
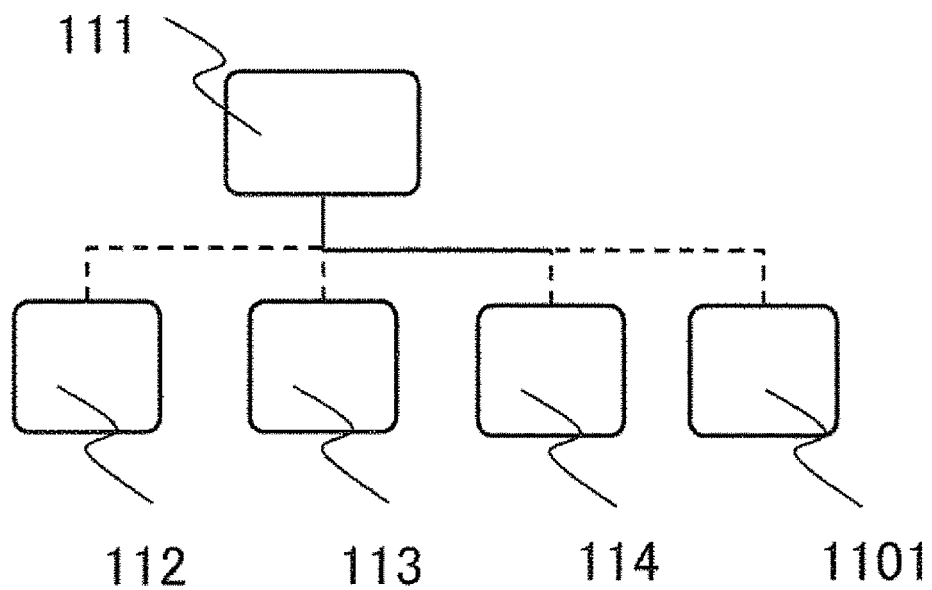
FIG. 18 is a diagram illustrating a configuration of a vehicle control device according to a third embodiment.

FIG. 18 is a diagram illustrating the configuration of the vehicle control device in this embodiment.

The present embodiment further includes front situation recognizing means 1101. The front situation recognizing means 1101 includes at least one element such as a navigation system, a camera, a radar, an inter-vehicle communication or a road-to-vehicle communication module.

The required deceleration estimation S204 using the front situation recognizing means in this embodiment will be described. Specifically, when it is determined that the preceding vehicle is not detected, the required deceleration (system determination) is output as 0, and when it is determined that the preceding vehicle is detected, as illustrated in FIG. 19, a required deceleration calculation (system determination) 1201 is calculated and output, on the basis of a relative speed $V_r$ and an inter-vehicle time THW. Here, the relative speed $V_r$ and the inter-vehicle time THW are calculated by the formulas (7) and (8).

[Formula 7]

$$V_r = V_f - V_e \quad (7)$$

[Formula 8]

$$THW = \frac{D}{|V_r|} \quad (8)$$

Here, $V_f$ is the speed of the preceding vehicle, $V_e$ is the speed of the own vehicle, D is the distance between the own vehicle and the preceding vehicle, and the setting is made so that the required deceleration becomes smaller as the inter-vehicle time is smaller and the relative speed is larger. Also, the required deceleration may be calculated using the formula (9) on the basis of the relative speed $V_r$ and the inter-vehicle time THW.

[Formula 9]

$$\alpha = c \frac{V_e}{THW} V_r \quad (9)$$

Here, C represents a driver-dependent constant. C is not limited to a fixed value and may be switched in accordance with a traveling scene or the like. Specifically, as illustrated in FIG. 20, the traveling state of the own vehicle is classified into "acceleration", "constant speed", and "deceleration" on the basis of the own vehicle speed, and C is changed on the basis of the current traveling state and a traveling state predicted by the front situation recognizing means. C represents the strength of the driver's response accompanied with change in the front situation. Therefore, when a case where there is no change between the current traveling state and the predicted traveling state is set as C1, the case of turning to acceleration is set as C2, the case of turning to constant speed is set as C3, and the case of turning to deceleration is set as C4, the magnitude relation is set as C4>C2>C3>C1. The predicted traveling state is determined on the basis of preceding vehicle information (deceleration, brake lamp, and turn signal of the preceding vehicle) and road information (signal color, intersection, curve, uphill gradient, downhill gradient, etc.). As a result, the estimation accuracy of the required deceleration of the driver accompanied with the change in the front situation is improved.

The front required deceleration $\alpha_d$ adopts the smaller deceleration between the required deceleration (driver operation) 401 and the required deceleration (system determination) 901, as the required deceleration. As a result, it is possible to achieve an appropriate deceleration, while ensuring safety. Further, since the system achieves appropriate deceleration, it is possible to reduce the frequency of driver's operation and improve comfort.

REFERENCE SIGNS LIST 100 vehicle
101 engine
102 power transmission mechanism
103 final decelerator
104 differential speed reducer
105 starter motor 106 generator
107 drive belt
108 battery
109 in-vehicle electric component
111 controller
112 accelerator depression amount detecting means
113 brake depression amount detecting means
114 vehicle speed detecting means
115 brake mechanism
116 torque converter
117 oil pump
118 transmission mechanism
119 clutch mechanism
120 oil pump driving chain
121 engine rotation speed detecting means
1101 front situation recognizing means

The invention claimed is:

1. A vehicle control device for controlling a vehicle comprising a power transmission mechanism configured to control power transmission between an engine and an axle, and a brake configured to exert braking force on the vehicle, and a controller configured to:
   estimate a required deceleration; and
   select a vehicle traveling state from a plurality of vehicle traveling states on the basis of the estimated required deceleration, and
   performing control to cause the vehicle to travel in the selected vehicle traveling state, the plurality of vehicle traveling states including:
      a power transmission engine stop traveling state in which power is transmitted by the power transmission mechanism, and the controller is configured to cause stopping of a fuel supply to the engine, and to control the brake to exert a braking force while allowing the vehicle to travel, and
      a power shutoff brake traveling state in which the controller is configured to cause stopping of the power transmission from the power transmission mechanism, and stopping of the fuel supply to the engine, and to control the brake so that the braking force is smaller than a braking force during the power transmission engine stop traveling state, and to allow the vehicle to travel.

2. The vehicle control device according to claim 1, the plurality of vehicle traveling states further comprising a coasting travel state in which the controller is configured to cause stopping of the power transmission from the power transmission mechanism and stopping of the fuel supply to the engine, and to allow the vehicle to travel by inertia without using the brake.

3. The vehicle control device according to claim 2, wherein the controller is further configured to:
   estimate a required deceleration,
   wherein, in the power shutoff brake traveling state, when the required deceleration estimated becomes smaller than a deceleration of the vehicle during the power shutoff brake traveling state, switch to the coasting travel state, and when the required deceleration is larger than a deceleration of the vehicle during the power shutoff brake traveling state, switch to the power transmission engine stop traveling state.

4. The vehicle control device according to claim 1, wherein the vehicle comprises at least one of a radar or a sensor configured to detect a front situation including a preceding vehicle speed and a front projection area, and the controller is configured to select the vehicle traveling state from the plurality of vehicle traveling states, on the basis of the front situation.

5. The vehicle control device according to claim 1, wherein the controller is further configured to:
   responsive to receiving information indicating that a depression amount of the accelerator pedal is zero and a depression amount of the brake pedal is in a range of zero to a predetermined value, estimate a driver-required deceleration that is a required deceleration from a driver operation.

6. The vehicle control device according to claim 1, wherein the controller is further configured to:
   set the required deceleration to a predetermined value until a depression amount threshold value is reached,
   generate a braking force from the accelerator pedal depression amount of zero and the brake pedal depression amount of zero, and
   responsive to determining the brake pedal depression amount becomes larger than the depression amount threshold value estimate a required deceleration decrease in accordance with the brake pedal depression amount.

7. The vehicle control device according to claim 1, further comprising:
   at least one of a radar or a sensor configured to detect a front situation of the own vehicle,
   wherein the controller is further configured to compare a system-required deceleration calculated on the basis of the front situation with a driver-required deceleration calculated on the basis of a accelerator pedal depression amount and a brake pedal depression amount, and output the smaller deceleration as the required deceleration.

8. The vehicle control device according to claim 7, wherein the controller is configured to correct the system-required deceleration calculated on the basis of the front situation based on a deceleration of the preceding vehicle and a deceleration of the own vehicle.

9. The vehicle control device according to claim 7, wherein the controller is configured to generate a correction amount of the system-required deceleration calculated on the basis of the front situation,
   wherein responsive to determining that a deceleration of the preceding vehicle is larger than zero, the correction amount of the system-required deceleration is generated to be larger than the correction amount at which the deceleration of the preceding vehicle is zero, or,
   wherein responsive to determining that a deceleration of the preceding vehicle is smaller than zero, the correction amount is generated to be larger than the correction amount when the deceleration of the preceding vehicle is larger than zero.

10. The vehicle control device according to claim 1, wherein the controller is configured to control at least one or more of (i) the transmission mechanism configured to adjust a loss torque, (ii) a brake actuator to exert the braking force irrespective of a brake pedal depression amount, or (iii) a shutter and a spoiler configured to adjust the air resistance, thereby adjusting the vehicle deceleration.

11. The vehicle control device according to claim 10, wherein the controller is further configured to:
   estimate a required deceleration,
   measure an own vehicle speed, and
   change a ratio of a loss amount caused by the transmission mechanism and a loss amount caused by the brake, on the basis of the required deceleration and the own vehicle speed.

12. The vehicle control device according to claim 10, wherein the controller is further configured to adjust the loss amount caused by the transmission mechanism by controlling a line pressure of the transmission, in a state of the transmission ratio of the transmission when a depression amount of an accelerator pedal is zero.

13. The vehicle control device according to claim 10, wherein the controller is further configured to:
   calculate a required loss torque on the basis of the estimated deceleration,
   wherein, responsive to determining that a minimum value of the loss torque caused by the transmission mechanism is larger than the required loss torque, the required loss torque is output by the brake mechanism.

14. The vehicle control device according to claim 1, wherein the controller is further configured to:
   estimate a required deceleration, and
   calculate a required loss torque on the basis of the deceleration,
   wherein, when a minimum value of a loss torque of the transmission caused by the transmission mechanism is larger than the required loss torque, the loss torque of the transmission is generated by the transmission mechanism, and a difference between the required loss torque and the loss torque of the transmission is adjusted by the controller at a brake actuator.

15. The vehicle control device according to claim 1, wherein the controller is further configured to:
   estimate a required deceleration,
   measure an own vehicle speed, and
   change a ratio of a loss amount caused by a shutter and a spoiler configured to adjust the air resistance and a loss amount caused by the brake, on the basis of the required deceleration and the own vehicle speed.

16. A vehicle control device for controlling a vehicle comprising a power transmission mechanism configured to control a power transmission state between an engine and an axle, a brake configured to exert braking force on the vehicle, and a controller configured to:
   estimate a required deceleration; and
   select among a plurality of vehicle traveling states on the basis of the required deceleration, and
   cause the vehicle to travel in a selected vehicle traveling state of the plurality of vehicle traveling state, the plurality of vehicle traveling states including:
      a power transmission engine stop traveling state in which the power transmission mechanism transmits power, in which the controller stops fuel supply to the engine and allows the vehicle to travel, and
      a power shutoff brake traveling state in which the power transmission mechanism stops power transmission and in which the controller stops fuel supply to the engine, and the controller causes the brake to exert a braking force while allowing the vehicle to travel,
   wherein shifting from the power shutoff brake traveling state to another vehicle traveling state including the power transmission engine stop traveling state is performed while the vehicle has a speed greater than 0.

* * * * *